United States Patent
Pahl

(10) Patent No.: US 6,438,987 B1
(45) Date of Patent: Aug. 27, 2002

(54) COMPACT COUNTERTOP FROZEN FOOD AND BEVERAGE SYSTEM FOR DOMESTIC USE

(76) Inventor: Richard Charles Pahl, 436 Date Palm Ct. NE., St. Petersburg, FL (US) 33703

( * ) Notice: Subject to any disclaimer, the term of this patent is extended or adjusted under 35 U.S.C. 154(b) by 0 days.

(21) Appl. No.: 09/948,347

(22) Filed: Sep. 7, 2001

Related U.S. Application Data

(63) Continuation-in-part of application No. 09/896,706, filed on Jun. 29, 2001.

(51) Int. Cl.⁷ .................................... A23G 9/00
(52) U.S. Cl. .............................. 62/342; 62/343
(58) Field of Search ....................... 62/342, 343, 389

(56) References Cited

U.S. PATENT DOCUMENTS

| | | | | |
|---|---|---|---|---|
| 4,392,361 A | * | 7/1983 | Cavalli | 366/309 |
| 4,429,549 A | * | 2/1984 | Randolphi | 366/149 |
| 4,538,427 A | * | 9/1985 | Cavalli | 165/42 |
| 4,653,281 A | * | 3/1987 | Van Der Veer | 366/144 |
| 4,664,529 A | * | 5/1987 | Cavalli | 366/144 |
| 4,681,458 A | * | 7/1987 | Cavalli | 366/149 |
| 4,736,600 A | * | 4/1988 | Brown | 222/146.6 |
| 4,838,702 A | * | 6/1989 | Tormitsu et al. | 366/144 |
| 4,913,713 A | * | 4/1990 | Bender et al. | 222/146.6 |
| 5,617,734 A | | 4/1997 | Chase et al. | |
| 5,845,512 A | | 12/1998 | Chase et al. | |
| 6,058,721 A | * | 5/2000 | Midden et al. | 62/136 |

\* cited by examiner

Primary Examiner—William E. Tapolcal
(74) Attorney, Agent, or Firm—Dorothy S. Morse

(57) ABSTRACT

A compact portable, self-contained and self-cleaning, domestic frozen food and beverage system capable of rapidly and automatically preparing and dispensing soft ice cream products, slush drinks, and frozen beverages in an efficient and spill-free manner. Ingredients are transferred into the freezing chamber via a paired bottle cap and receptacle that block ingredient transfer unless the bottle cap is securely seated within the receptacle. To begin the freezing process, a user would simply select and depress the start button corresponding to the type of product desired. An inlet port or ports allowing for pressurized fluid flow evenly about the freezing chamber and a rotating auger member disposed within the freezing chamber help the present invention to achieve a rapidly frozen product. Once operation begins, a microprocessor controls the temperature and speed of ingredient mixing with automatic shut-down occurring when auger torque indicates that the product has reached the desired consistency.

7 Claims, 8 Drawing Sheets

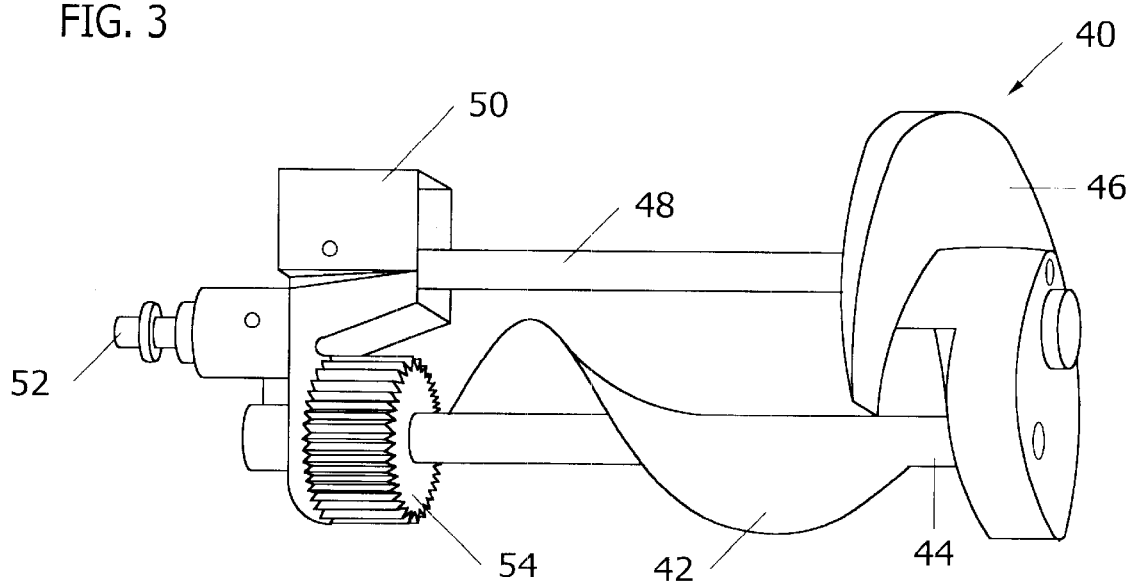
FIG. 3
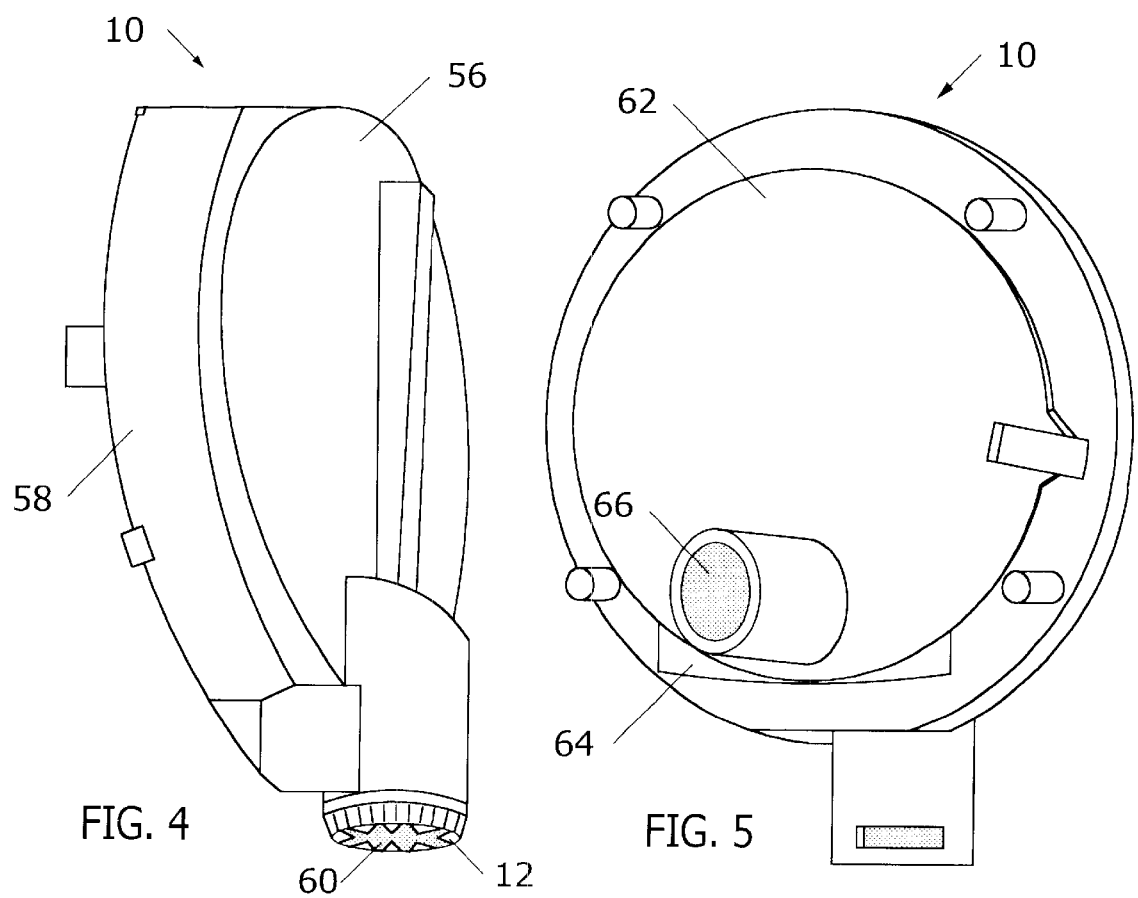
FIG. 4
FIG. 5

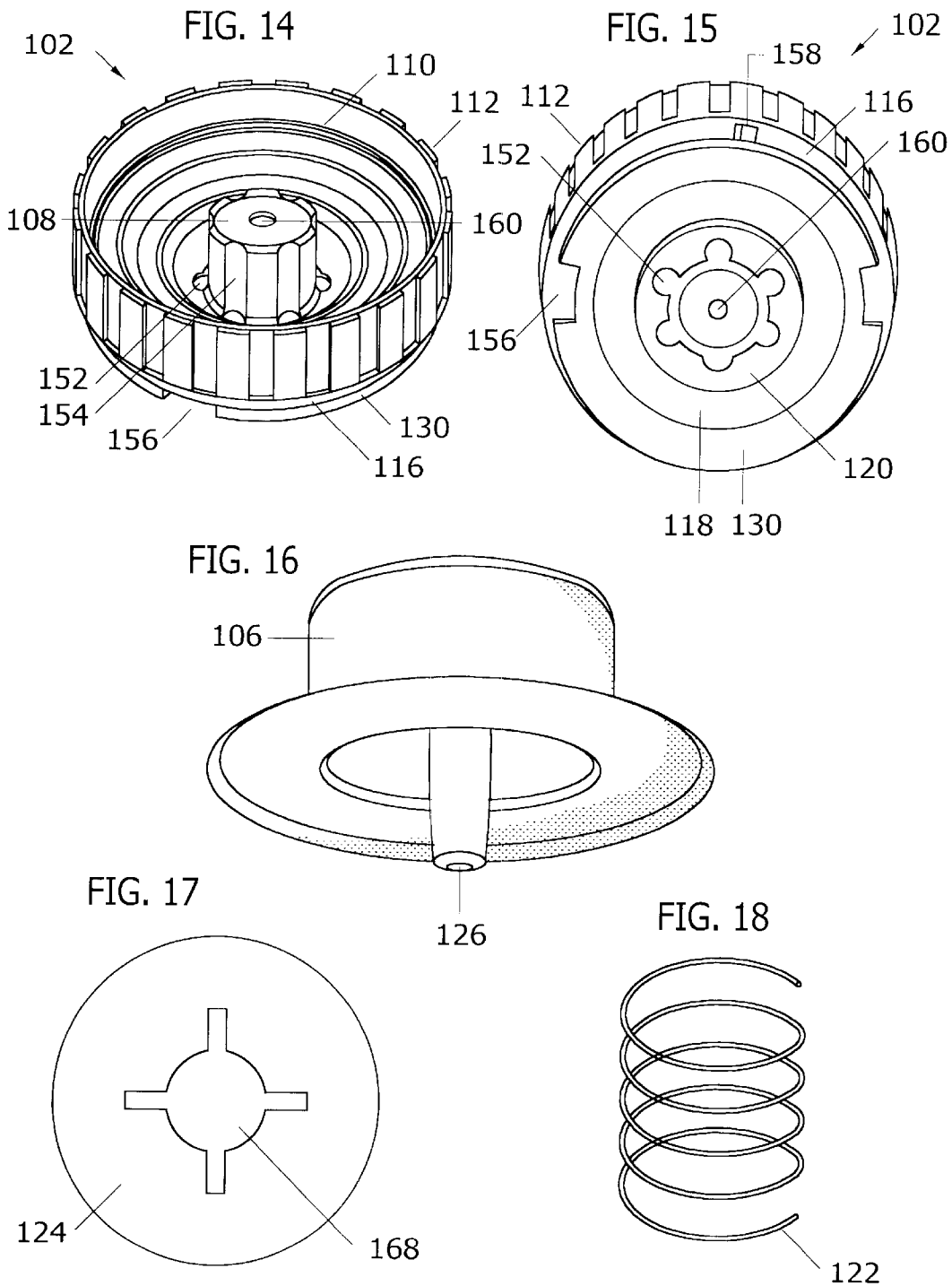

COMPACT COUNTERTOP FROZEN FOOD AND BEVERAGE SYSTEM FOR DOMESTIC USE

This patent application is a continuation-in-part patent application based upon U.S. patent application Ser. No. 09/896,706 filed on Jun. 29, 2001 in the name of co-inventors Michael Hetherington and Richard C. Pahl, the sole inventor of the invention herein, and the applicant herein requests all benefit to which he is entitled from the above-identified parent application.

BACKGROUND—Field of Invention

This invention relates to the field of soft ice cream freezers, and frozen beverage dispensers, specifically to a small and portable, self-contained, self-cleaning domestic frozen food and beverage system having the capability of preparing and dispensing soft ice cream products, frozen yoghurt products, milk shakes, slush drinks, and other smooth frozen foods and beverages automatically, in a short period of time, and in an efficient and spill-free manner. A user would simply transfer ingredients for the desired product from a holding container with a specifically configured bottle cap into a paired receptacle communicating with the thermally conductive freezing chamber, the paired bottle cap and receptacle blocking transfer of ingredients until the bottle cap is securely seated within the receptacle. Ingredient flow is again blocked as soon as the bottle cap begins to be drawn away from the receptacle, thus avoiding the opportunity for any spills. In addition to being spill-free, ingredient transfer into the freezing chamber can also be made hands-free. Once the correct amount of the desired ingredients has been transferred into the freezing chamber of the present invention, and since it is a fully integrated, automated, programmable machine, to begin the freezing process a user would simply select and depress the start button corresponding to the type of product desired. An inlet port or ports evenly disposed about the freezing chamber to introduce fluid flow under pressure around the outside of the freezing chamber for maintaining a substantially uniform temperature therein and an auger member disposed within the freezing chamber in a position to rotate about its longitudinal axis in a first direction while concurrently rotating about the longitudinal axis of the freezing chamber in a second direction that is substantially opposite to the first rotational direction, help the present invention to achieve a rapidly frozen product, typically within a time period of less than 15 minutes. Once operation begins, a microprocessor within the housing controls the temperature and speed of ingredient mixing until auger toque indicates that the product has reached the consistency desired, whereafter the system automatically shuts itself off after sending a signal to the user that the partially frozen product is ready for consumption.

BACKGROUND—Description of Prior Art

There have been many ice cream freezers designed for domestic use. Some prior art ice cream freezers contemplate a thermally conductive freezing chamber that is removably placed within an insulated outer housing filled with freezing agent during an initial cooling phase, during which the product within the freezing chamber is thoroughly mixed, with the freezing chamber being placed into the freezer portion of a refrigerator after the initial cooling phase for product storage until use. Others contemplate the use of a freezing agent being routed through coils placed in contact with the thermally conductive freezing chamber. Most can be messy to use, and/or awkward or cumbersome to clean after use. While in U.S. Pat. No. 5,845,512 and in U.S. Pat. No. 5,617,734 the inventor herein has been one of several co-inventors previously disclosing a freezing chamber having a plurality of inlet ports and the use of an auger member with concurrently opposing dual rotational means to produce a soft frozen food product, there is no prior art known that discloses a compact and easily portable, self-contained, self-cleaning, fully integrated, automated and programmable domestic frozen food and beverage system with all of the features and advantages of the present invention, including the capability of preparing and dispensing soft ice cream products, frozen yoghurt products, milk shakes, slush drinks, and other types of frozen food and beverage products automatically, in a short period of time, and in a neat, efficient and spill-free manner.

SUMMARY OF INVENTION—Objects and Advantages

The primary object of this invention is to provide a compact, self-contained domestic freezing and dispensing system for countertop use that can chill foods and beverages to a desired temperature and consistency in a short period of time. A further object of this invention is to provide a freezing and dispensing system that is efficient and easy to use. It is also the object of this invention to provide a freezing and dispensing system that creates partially frozen food and beverage products automatically and without a mess. It is a further object of this invention to provide a freezing and dispensing system that is compact in configuration for countertop use, sufficiently lightweight so as to be easily portable, and aesthetically pleasing in design. It is also an object of this invention to provide a freezing and dispensing system that is self-cleaning after use. It is a further object of this invention to provide a freezing and dispensing system that allows for spill-free introduction of product ingredients into its freezing chamber. It is also an object of this invention to provide a freezing and dispensing system with which a user can produce a wide variety of partially frozen food and beverage products.

As described herein, properly manufactured and used, the frozen food and beverage preparation and dispensing system of the present invention is a fully integrated, automated, and programmable machine that is small, compact, and easily portable, and allows domestic users to make smooth frozen foods and beverages rapidly and without a mess. In 15 minutes or less, a user could have soft ice cream, frozen yoghurt, a milk shake, or a slush drink, simply by 1) adding a prepackaged mix into the system though a dispensing bottle cap and receptacle combination that prevents ingredient flow until the dispensing bottle cap is fully seated within the receptacle, 2) discarding the dispensing container in an appropriate receptacle, 3) selecting one of several touch keys or buttons that corresponds to the desired final consistency of the intended product, and when the system signals to a user that the product is finished 4) selecting the touch key or button that will cause the soft frozen product to be dispensed. When the 'Dispense' mode is used, the auger operates at a higher speed to push frozen product, or cleaning solution, beyond the beyond the pattern cap attached to the dispensing head. Clean up after use is also automated, fast, and efficient. The user simple adds a cleaning solution, sanitizing solution, or water instead of food product ingredients, and then selects the touch key or button indicating a 'wash' or 'cleaning cycle'. The auger speed will increase beyond that routinely used to make a food or beverage product, and agitate the water or solutions within the inner tube of the freezing chamber to thoroughly and expeditiously clean the inside surfaces of the freezing chamber. Once the cleaning cycle is complete, audible and/or visual signals are produced to signal the user that the cleaning process is done, after which the user would need to select the 'Dispense'touch key or button that will eject the cleaning solution from the system. The present invention is sufficiently compact in configuration and light in weight, so as to be easily moved from one place to another in a domestic kitchen or one in a small eatery. It is self-contained, the user cannot check on the product part way though the freezing process except by disconnection of the system from its available power source, and the user is not required to separate components prior to cleaning it as the cleaning cycle is fully automatic. It is also versatile since it can produce a wide variety of food and beverage products, and since it can create consistent and desirable products in a short period of time and is so easy to use, a person preparing a meal could potentially several frozen food products freshly made for guests in the no more time than it would take to prepare the main course. Since the present invention is fully automated and is run by the touch of one button or key, it is simple enough for children to use, even younger children as long as adult supervision was nearby. Through use of a paired dispensing cap and receptacle that together prevent dispensing unless the dispensing cap is fully seated within the receptacle, preventing any mess. Even when one attempts to lift the dispensing cap from the receptacle after ingredient transfer into the receptacle, disconnection is spill-free as ingredient transfer is blocked again once the cap member begins to be lifted away from the receptacle. As an added convenience, when a bayonet turn is applied to the dispensing cap during the time it is seated within the receptacle, the cap member becomes locked within the receptacle and transfer can be hands-free. Also, the auger has a particular configuration and mixing action that is efficient in preparing a soft frozen product, and the freezing chamber has a configuration incorporating a thermally conductive inner tube and an non-conductive outer tube which together form a sealed chamber through which coolant can be dispersed evenly around the inner tube, allowing for rapid cooling of any food product being mixed within the inner tube. An inlet port, or ports evenly disposed about the freezing chamber, would introduce fluid flow under pressure around the outside of the freezing chamber for maintaining a substantially uniform temperature therein. Also, in addition to its other features, its compact self-contained design is attractive and allows for convenient dispensing of the product. No domestic ice creamer making or frozen beverage dispensing device is known with all of the features and advantages of the present invention.

The description herein provides preferred embodiments of the present invention but should not be construed as limiting the scope of the fully integrated, automated, programmable machine herein for preparing and dispensing smooth frozen foods and beverages. For example, variations in the number of inlet ports used in its freezing chamber; the positioning of some of the components within the chassis; the type of materials used for the chassis, outer housing, front cover, and dispensing head assembly; and the size of the receptacle and paired bottle cap; other than those shown and described herein may be incorporated into the present invention. Thus, the scope of the present invention should be determined by the appended claims and their legal equivalents, rather than being limited to the examples given.

BRIEF DESCRIPTION OF THE DRAWINGS

FIG. 3 is a side view of the auger assembly in the most preferred embodiment of the present invention with a main shaft substantially parallel to an auger shaft having an auger blade, a front wiper on one end of the auger shaft and a rear wiper near to the opposing end of the wiper shaft, and with a gear and drive shaft used for rotational connection to an auger motor, shown in FIG. 6.

FIG. 4 is a side view of the dispensing head assembly of the most preferred embodiment of the present invention having a front portion and a rear portion, with a pattern cap extending below the front portion of the dispensing assembly.

FIG. 5 is a rear view of the preferred embodiment of the dispensing head assembly of the present invention having a centrally positioned shut-off member secured against the rear surface of the front dispensing head portion by a seal plate and a seal ring.

FIG. 7 also shows the front cover positioned over the dispensing head, and a condenser and fax located within the chassis near to the auger motor. FIG. 8 further shows the freezing chamber supported within the chassis and connected to the auger motor, a solenoid is supported within the chassis adjacent to the freezing chamber, the dispensing recess is connected to the chassis, and a solenoid control is positioned through the chassis below the solenoid and adjacent to the dispensing recess. FIG. 9 shows the freezing chamber supported within the chassis and connected to the auger motor, a compressor secured within the chassis below the freezing chamber with the return fitting attached to the freezing chamber being connected to the compressor, a power cord connected through the chassis to the transformer, feet attached to the bottom surface of the chassis, and a fan and condenser positioned within the chassis above the transformer and adjacent to the auger motor. FIG. 10 shows a compressor mounted within the chassis of the most preferred embodiment of the present invention, the fan and condenser mounted within the upper rear portion of the chassis, a power cord attached through the chassis, a printed circuit board positioned within the chassis adjacent to the compressor, a solenoid control secured through the chassis adjacent to printed circuit board, and the solenoid positioned above the solenoid control. FIG. 11 shows the preferred embodiment of the present invention having a compressor mounted within the chassis, the fan and condenser mounted within the upper rear portion of the chassis, the solenoid and solenoid control being mounted within the front portion of the chassis, and supply adjacent to the compressor, a solenoid control secured through the chassis adjacent to printed circuit board; and the solenoid positioned above the solenoid control.

FIG. 11 is a side view of the most preferred embodiment of the present invention having a chassis, a compressor mounted within the chassis, the fan and condenser mounted within the upper rear portion of the chassis, the solenoid and solenoid control being mounted within the front portion of the chassis, and supply tubing for transfer of ingredient to the inner tube connecting the receptacle to the freezing chamber.

FIG. 14 is a perspective top view of the most preferred embodiment of the present invention bottle cap member having a ribbed outer surface, a spirally threaded inner surface, a central spring housing upwardly depending from its lower sealed end, a bottom rim, a side channel adjacent to and above the bottom rim, a notch through the bottom rim, with its spring housing also having a central aperture through its top surface, several slots through its outside surface, and a small hole at the lower end of each slot.

FIG. 15 is a perspective bottom view of the preferred embodiment of the present invention bottle cap member having a ribbed outer surface, a bottom rim, a side channel adjacent to and above the bottom rim, two opposing notches through the bottom rim, and a stop positioned within the channel centrally between the notches, with the tip of the activation pin attached to the spring-biased valve closure member centrally visible through the bottom of the bottle cap member, the disk-like spring nut visible around the activation pin, and the small holes at the lower end of the slot in the spring housing being visible around the spring nut.

FIG. 16 is a perspective side view of the preferred embodiment of the present invention spring-biased valve closure member having a cylindrical main body with an upper closed end and a bottom open end, a downwardly curved flange extending from its open end, and a central activation pin downwardly depending from the upper closed end in a position extending below the outer edge of the flange.

FIG. 17 is a top view of the preferred embodiment of the present invention spring nut having a central cutout pattern comprised of a round hole intersecting an X-shaped opening wherein the length of each arm member of the X-shaped opening is approximately twice that of the diameter dimension of the round hole.

FIG. 18 is a perspective side view of the preferred embodiment of the present invention coil spring having a substantially uniform diameter dimension and uniformly spaced apart coils.

DETAILED DESCRIPTION OF PREFERRED EMBODIMENTS

The present invention comprises a a small and portable, self-contained, self-cleaning domestic frozen food and beverage system having the capability of preparing and dispensing soft ice cream products, frozen yoghurt products, milk shakes, slush drinks, and other smooth frozen foods and beverages automatically, in a short period of time, and in an efficient and spill-free manner. A user would simply transfer ingredients for the desired product from a holding container with a specifically configured bottle cap into a paired receptacle communicating with the thermally conductive freezing chamber, the paired bottle cap and receptacle blocking transfer of ingredients until the bottle cap is securely seated within the receptacle. Ingredient flow is again blocked as soon as the bottle cap begins to be drawn away from the receptacle, thus avoiding the opportunity for any spills. In addition to being spill-free, ingredient transfer into the freezing chamber can also be made hands-free. Once the correct amount of the desired ingredients has been transferred into the freezing chamber of the present invention, and since it is a fully integrated, automated, programmable machine, to begin the freezing process a user would simply select and depress the start button corresponding to the type of product desired. An inlet port or ports evenly disposed about the freezing chamber to introduce fluid flow under pressure around the outside of the freezing chamber for maintaining a substantially uniform temperature therein and an auger member disposed within the freezing chamber in a position to rotate about its longitudinal axis in a first direction while concurrently rotating about the longitudinal axis of the freezing chamber in a second direction that is substantially opposite to the first rotational direction, help the present invention to achieve a rapidly frozen product, typically within a time period of less than 15 minutes. Once operation begins, a microprocessor within the housing controls the temperature and speed of ingredient mixing until auger toque indicates that the product has reached the consistency desired, whereafter the system automatically shuts itself off after sending a signal to the user that the partially frozen product is ready for consumption.

Figure 1:
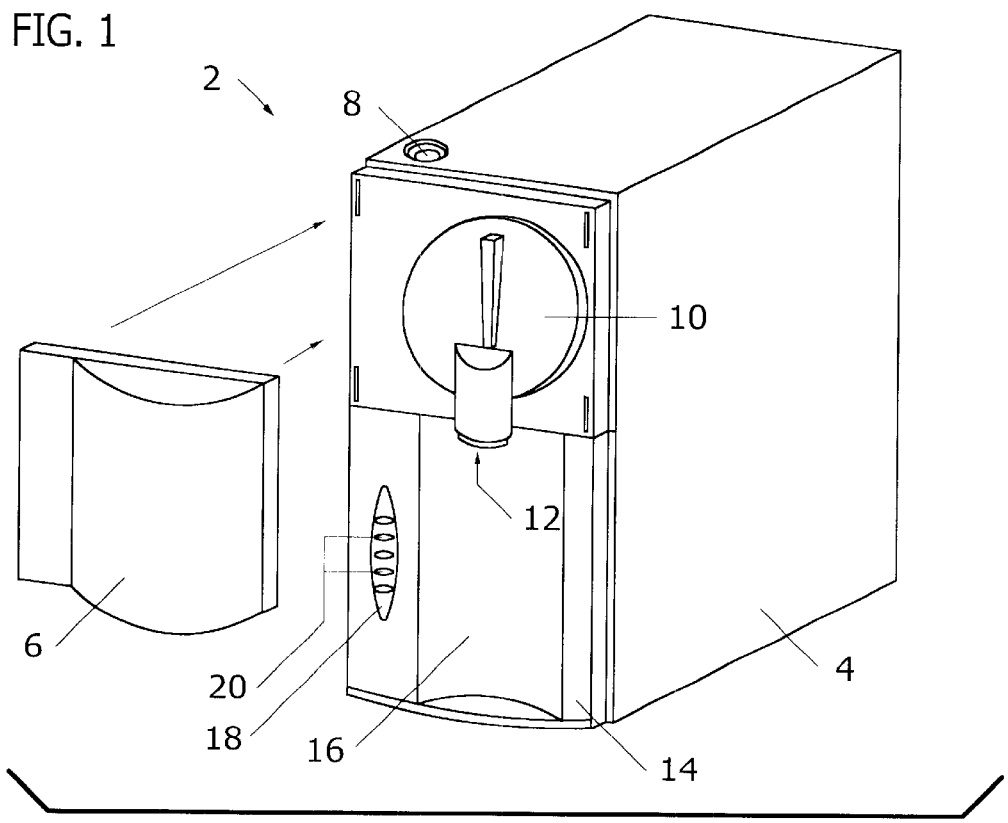
FIG. 1 is an exploded view of the most preferred embodiment of the present invention with its removable front cover poised in a position for attachment over the dispensing head assembly, a receptacle positioned within the top surface of its housing for adding unfrozen food and beverage ingredients, a dispensing recess positioned through the front of the housing beneath the pattern cap attached to and extending below the dispensing head assembly, and touch key controls through the front of the housing beside the dispensing recess.

FIG. 1 shows the most preferred embodiment of the present invention 2 with its removable front cover 6 poised in a position for attachment over the dispensing head assembly 10, a receptacle 8 positioned within the top surface of its housing 4 for adding unfrozen food and beverage ingredients (not shown) to its freezing chamber shown in FIG. 3 by the number 22, a dispensing recess 16 positioned through the front of housing 4 beneath the pattern cap 12 attached to and extending below dispensing head assembly 10, and a control panel 18 of touch key controls 20 through the front of housing 4 to one side of dispensing recess 16. Cover 6 is removable for access to dispensing assembly 10. However, for routine use present invention 2 is self-contained and automated, requiring little maintenance other than the addition of food and beverage ingredients through receptacle 8 and the initiation of an automated cleaning cycle when needed between production of different types of consumable products (not shown). Dispensing recess 16 is configured to allow a user to insert a cup or other container (not shown) beneath pattern cap 12 as a consumable product is being dispensed. Although not limited to such language, in the most preferred embodiment of the present invention touch key controls 20 would be entitled "SOFT SERVE", "SLUSH", "MILK SHAKE", "WASH", AND "DISPENSE". Each touch key control 20 would engage the printed circuit board 172 shown in FIG. 10 to control the mixing and cooling of ingredients introduced into freezing chamber 22 by way of receptacle 8 at different predetermined speeds and targeted temperatures.

Figure 2:
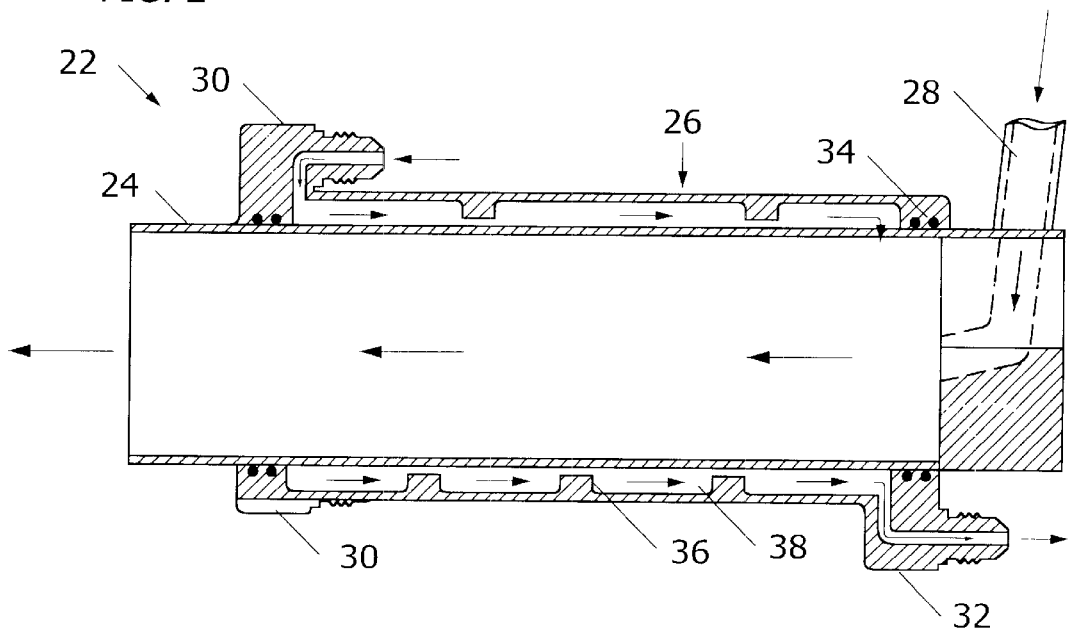
FIG. 2 is a sectional side view of the freezing chamber of the most preferred embodiment of the present invention with large arrows showing ingredient flow through a feed tube elbow that would be connected by tubing to the receptacle in FIG. 1, the ingredients going through the inner tube, an outer tube surrounding the central portion of the inner tube, two supply fittings for coolant being near to the dispensing end of the inner tube and an return fitting for coolant being near to the feed tube elbow end of the inner tube, and small arrows showing flow of coolant between the inner tube and the outer tube, with o-rings creating an air-tight seal between the inner tube and the outer tube, and ducting creating turbulence in coolant flow to enhance flow density and effect faster cooling of ingredients within the thermally conductive inner tube.

FIG. 2 shows the freezing chamber 22 of the most preferred embodiment of the present invention with large arrows showing ingredient flow through a feed tube elbow 28 that would be connected by tubing (shown by the number 100 in FIG. 11) to the receptacle 8 in FIG. 1, the ingredients going through the inner tube 24, an outer tube 26 surrounding the central portion of the thermally conductive inner tube 24, two supply fittings 30 for coolant (shown by small arrows) being near to the dispensing end of inner tube 24 and a return fitting 32 for coolant being near to the feed tube elbow 28 end of inner tube 24, the flow of coolant traveling in a sealed area 38 between inner tube 24 and outer tube 26, with O-rings 34 creating the air-tight seal needed between inner tube 24 and outer tube 26, and ducting 36 creating turbulence in the coolant flow to enhance flow density and effect faster cooling of ingredients within the thermally conductive inner tube 24.

Figure 6:
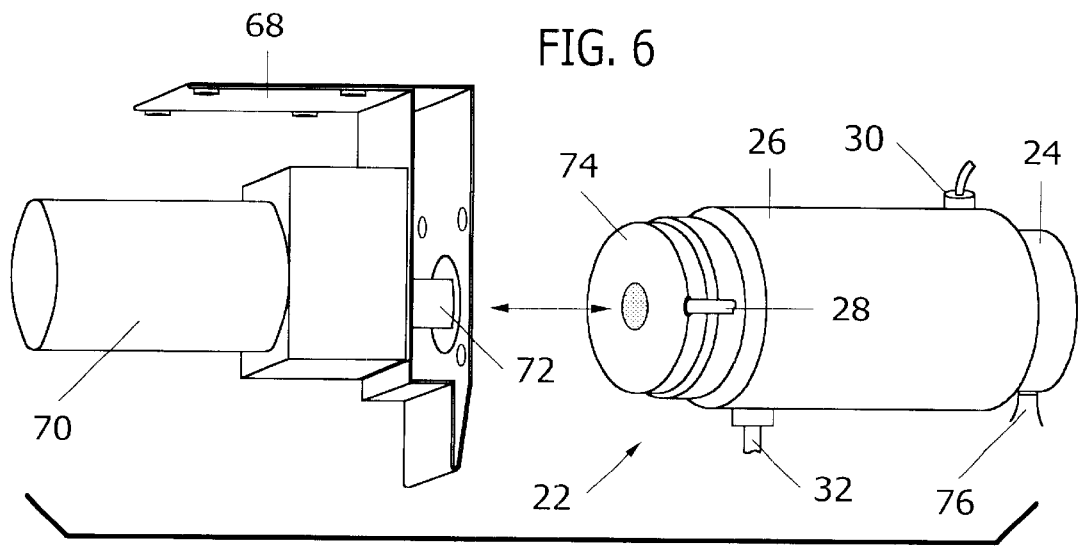
FIG. 6 is an exploded view of the freezing chamber and auger motor of the most preferred embodiment of present invention with a motor bracket connected to the auger motor and having an opening that allows a drive shaft adapter to connect to the auger assembly drive shaft when positioned within the freezing chamber.

FIG. 3 shows the auger assembly 40 in the most preferred embodiment of the present invention with a main shaft 48 substantially parallel to an auger shaft 44 having an auger blade 42, a front wiper 46 on one end of the auger shaft 44 and a rear wiper 50 near to the opposing end of auger shaft 44, and with a gear 54 and drive shaft 52 used for rotational connection to an auger motor 70, shown in FIG. 6.

FIGS. 4 and 5 show the dispensing head assembly 10 of the most preferred embodiment of the present invention having a front portion 56 and a rear portion 58, with a pattern cap 12 having a dispensing opening 60 extending below the front portion of dispensing head assembly 10. FIG. 5 also shows the preferred embodiment of dispensing head assembly 10 having a centrally positioned shut-off member 62 secured against the rear surface of front dispensing head portion 56 by a seal plate 64 and a seal ring 66.

FIG. 6 shows the freezing chamber 22 and auger motor 70 of the most preferred embodiment of present invention with a motor bracket 68 connected to auger motor 70 and having an opening that allows a drive shaft adapter 72 to connect to the auger assembly drive shaft 52 within the inner tube 24 of freezing chamber 22. The end cap 74 attached to the end of freezing chamber 22 adjacent to feed tube elbow 28 has a central aperture for connection of adapter 72 to connect to the auger assembly drive shaft 52. FIG. 6 also shows outer tube 26 surrounding inner tube 24, with coolant supply fitting 30 and coolant return fitting 32 being positioned for circulation of coolant (shown by small arrows in FIG. 2) within the sealed area 38 (shown in FIG. 2) between thermally conductive inner tube 24 and non-conductive outer tube 26. Further, FIG. 6 shows a thermistor connected to the thermally conductive inner tube 24 of freezing chamber 22 for temperature measurement.

Figure 7:
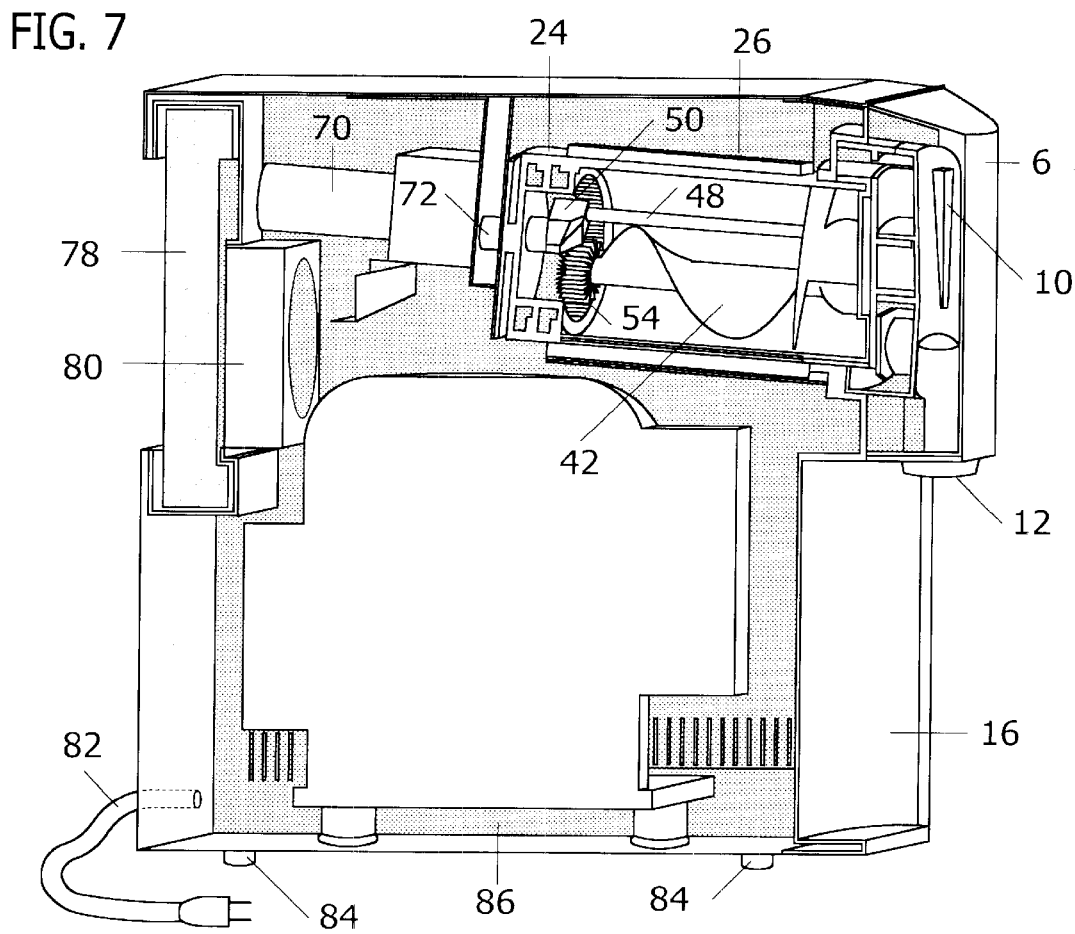
FIGS. 7–11 show the most preferred embodiment of the present invention having a chassis, the freezing chamber supported within the chassis.
Figure 8:
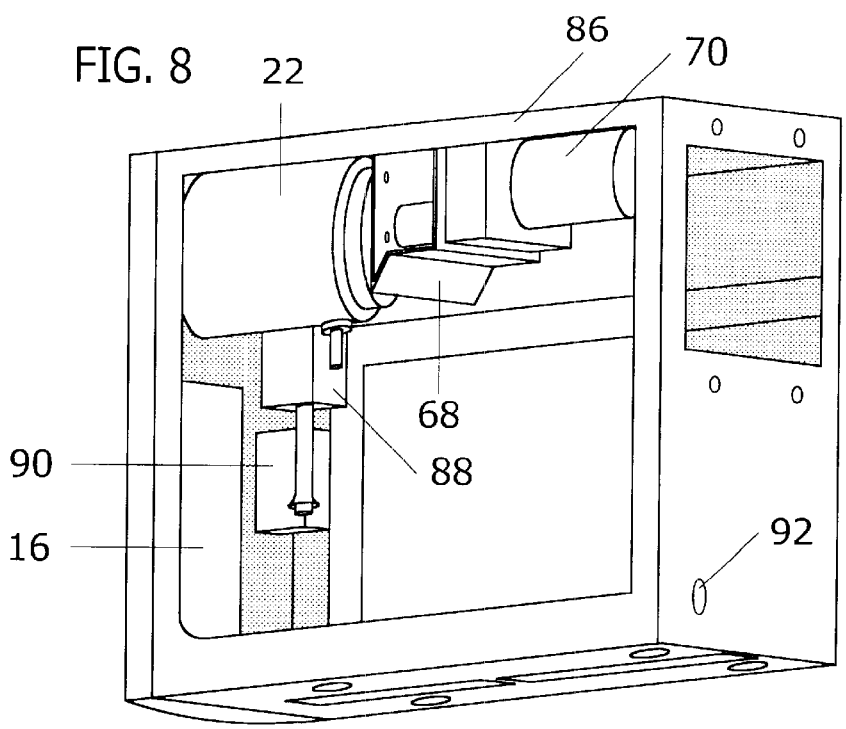
Figure 9:
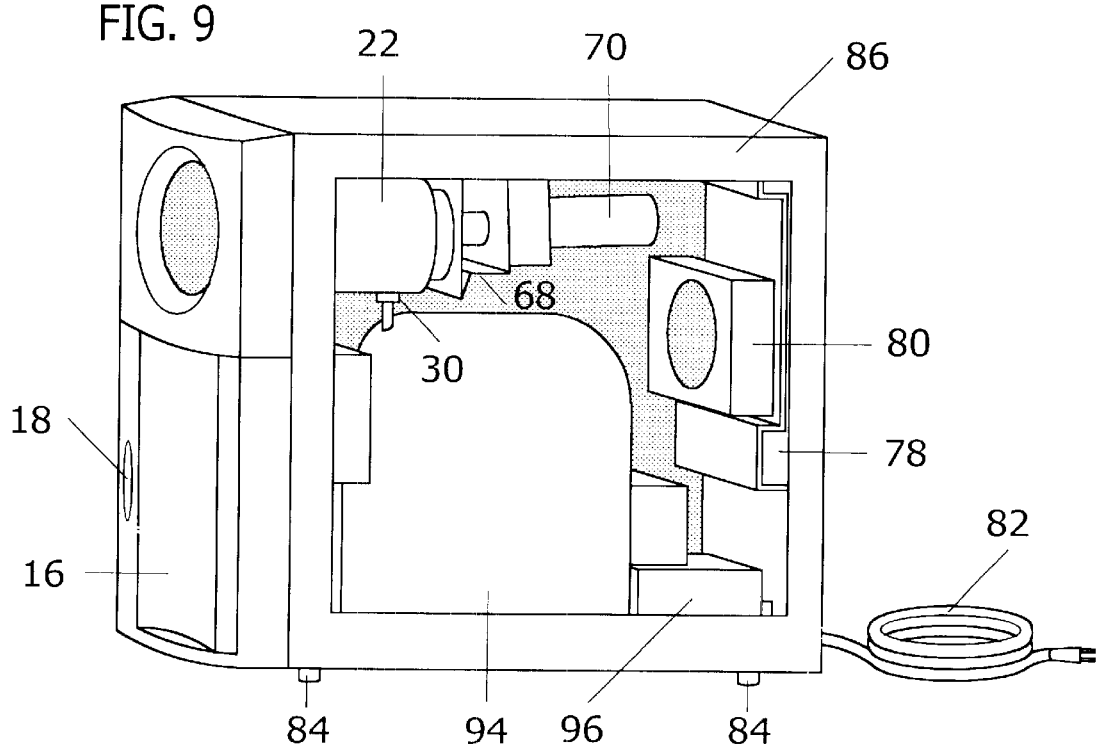
Figure 10:
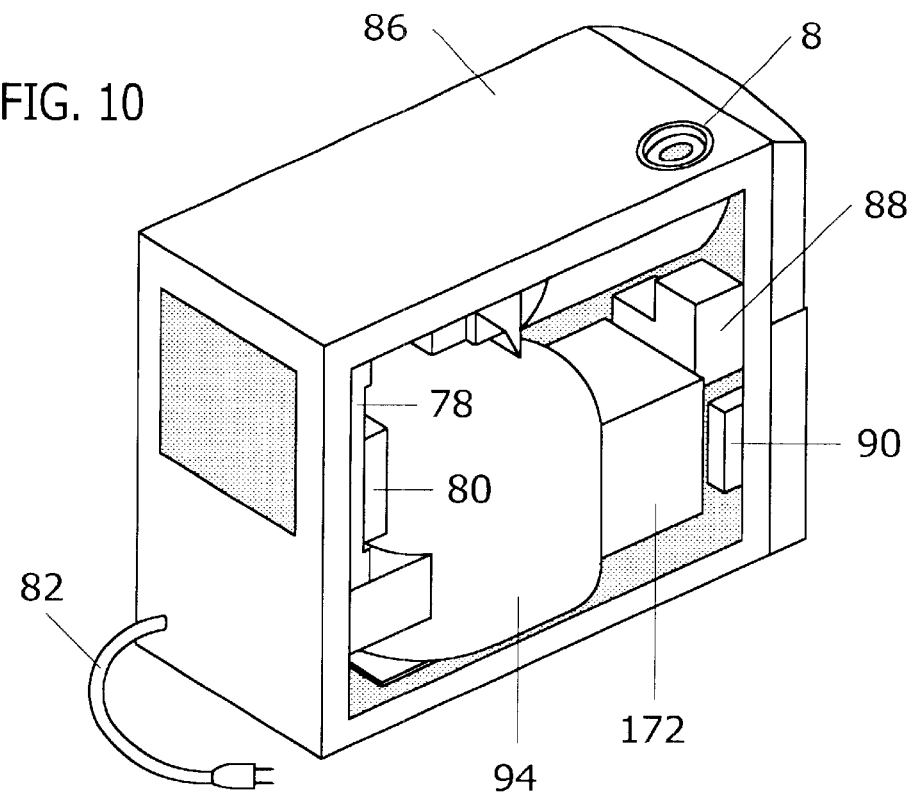
Figure 11:
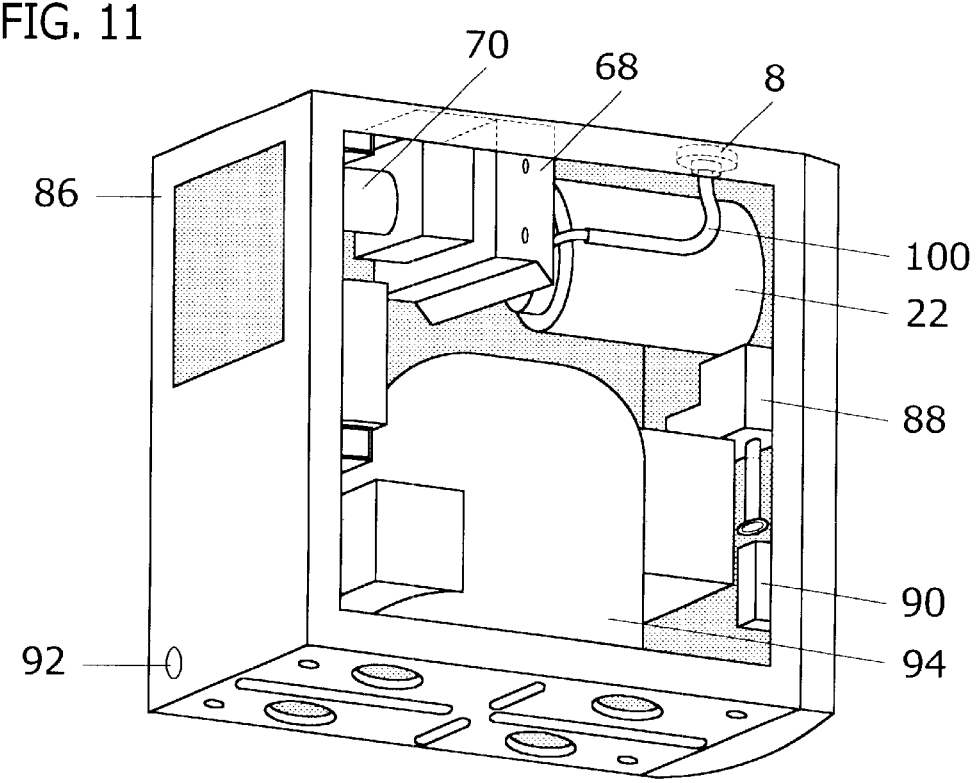

FIGS. 7–11 show the most preferred embodiment of the present invention having a chassis 86 and freezing chamber 22 supported within chassis 86. FIG. 7 also shows front cover 6 positioned over dispensing head assembly 10, and a condenser 78 and a fan 80 located within chassis 86 near to auger motor 70. FIG. 7 further shows auger assembly 40 positioned within freezing chamber 22 and vent openings 178 near to the bottom of chassis 86 to assist fan 80 in dissipating heat from chassis 86. FIG. 8 shows freezing chamber 22 supported within chassis 86 and connected to auger motor 70, with auger motor 70 being supported within chassis 86 by motor bracket 68. FIG. 8 also shows a solenoid 88 secured within the front portion of chassis 86, adjacent to freezing chamber 22, dispensing recess 16 being connected to the front of chassis 86, and a solenoid control 80 positioned through chassis 86 below solenoid 88 and adjacent to dispensing recess 16. The control panel 18 shown in FIG. 1 is electrically connected through chassis 86 to solenoid control 80. FIG. 8 further shows an opening 92 in the rear lower portion of chassis 86 for connection of power cord 82 (shown in FIG. 9). FIG. 9 shows freezing chamber 22 supported within chassis 86 and connected to auger motor 70, with auger motor being connected to chassis 86 through use of motor bracket 68. FIG. 9 also shows a compressor 94 secured within chassis 86 below freezing chamber 22 with return coolant fitting 32 attaching freezing chamber 22 to compressor 94. FIG. 9 further shows a power cord 82 being connected through chassis 86 to a transformer 96, feet 84 attached to the bottom surface of chassis 86, and fan 80 and condenser 78 positioned within chassis 86 above transformer 96 and adjacent to auger motor 70. Dispensing recess 16 and control panel 18 are both connected to the front portion of chassis 86. The number of feet 84 used is not critical, nor is their configuration or the materials from which they are made. However, it is contemplated for feet 84 to be made from a high friction material, such as rubber. FIG. 10 shows compressor 94 mounted within chassis 86 of the most preferred embodiment of the present invention, fan 80 and condenser 78 mounted within the upper rear portion of chassis 86, a power cord 82 attached through chassis 86 for electrical connection to remote power supply, a printed circuit board 172 positioned within chassis 86 adjacent to compressor 94, solenoid control 90 secured through chassis 86 adjacent to printed circuit board 172 for connection to the control panel 18 shown in FIG. 1, and solenoid 88 secured within chassis 86 above solenoid control 90. FIG. 11 shows the preferred embodiment of the present invention having compressor 94 mounted within chassis 86, fan 80 and condenser 78 mounted within the upper rear portion of chassis 86, solenoid 88 and solenoid control 90 being mounted within the front portion of chassis 86, and supply tubing 100 for transfer of non frozen consumable ingredients (not shown) connecting receptacle 8 to the inner tube 24 within freezing chamber 22.

Figure 12:
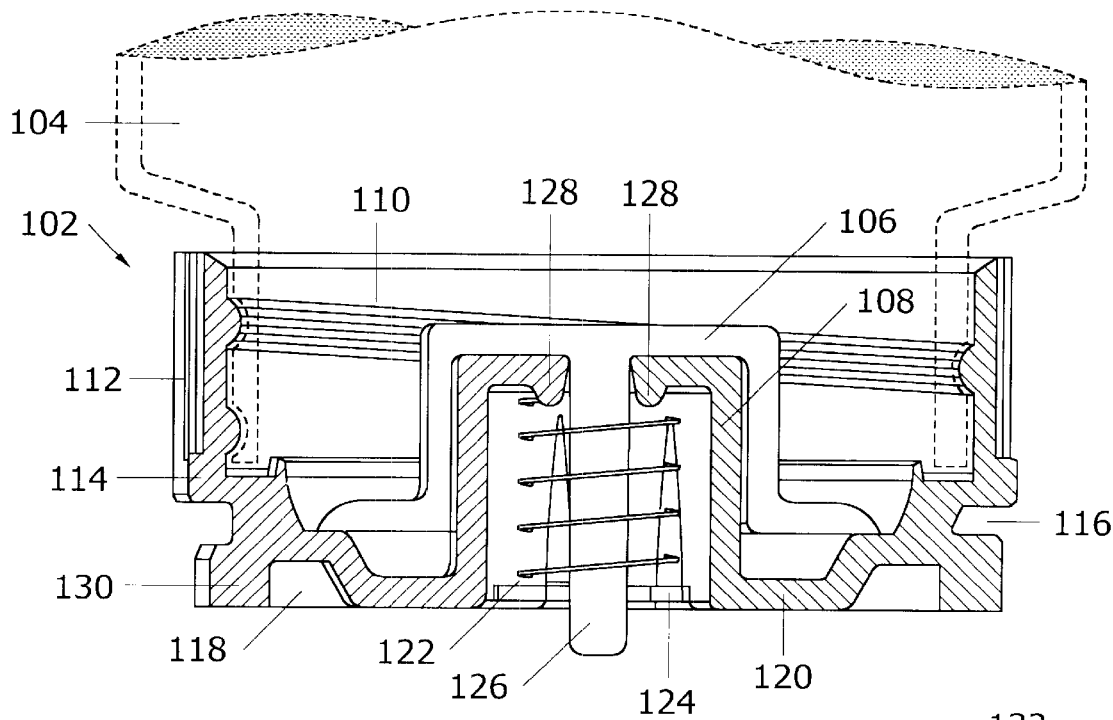
FIG. 12 is a sectional side view of the most preferred embodiment of the present invention dispensing bottle cap assembly having a bottle cap member, a spring housing attached to the sealed end of the bottle cap member, a valve closure member seated upon the spring housing with an activation pin inserted through an upper central opening in the spring housing, a disk-like spring nut positioned at the lower open end of the spring housing, and a spring positioned within the spring housing between the spring nut and the central opening in the upper end of the spring housing, with an inverted bottle in broken lines having a neck opening with external threads and being used to show the bottle cap assembly in use prior to connection with its paired receptacle.

FIG. 12 shows the most preferred embodiment of the present invention dispensing bottle cap assembly 102 having a bottle cap member 114 connected around the neck of an inverted holding container 104. FIG. 12 shows bottle cap member 114 having an arcuate open upper end and spiral threads 110 on its inside surface configured for connection to a complementary pattern of threads (not shown) on the type of holding container 104 intended for use with dispensing bottle cap assembly 102 and from which a quantity of fluid or dry material (not shown) would be transferred. FIG. 12 also shows bottle cap member 114 having a substantially sealed end in a position opposed from its open upper end, of which an upwardly depending spring housing 108 is an important part. The most preferred embodiment of dispensing bottle cap assembly 102 further has stepped interior walls with obtuse angles between each riser and the next adjacent horizontally extending surface below. The openings in the substantially sealed end of bottle cap member 114, which are not shown in FIG. 12, include a plurality of small holes, shown by the number 152 in FIGS. 14 and 15, which are spaced apart from one another and positioned around the base of spring housing 108, and the central opening, shown in FIG. 14 by the number 160, through the top surface of spring housing 108 and through which the activation pin 126 of valve closure member 106 is inserted during material transfer use. Spring housing 108 is hollow and substantially cylindrical in configuration with a small downwardly depending circular ridge 128 on its inside upper surface, adjacent to central opening 160. Circular ridge 128 maintains the upper end of spring 122 in a substantially centered position within spring housing 108 during material transfer use. FIG. 12 shows spring housing 108 substantially centered within the sealed end of bottle cap member 114, the central bottom surface around spring housing 108 being identified by the number 120, and an outer bottom rim 130 of bottle cap assembly 102 being separated from central bottom surface 120 by a circular bottom channel 118. Bottom rim 130 is also separated from the ribbed outer surface 112 on the upper portion of bottle cap member 114 by a circular side channel 116. Two opposing notches 156, not shown in FIG. 12 but illustrated in FIG. 15, are located through bottom rim 130. Notches 156 are configured and dimensioned to permit entry of the substantially rectangular protrusion 144 into side channel 116 so that locked engagement between dispensing bottle cap assembly 102 and receptacle 8 can be achieved when dispensing bottle cap assembly 102 is rotated relative to receptacle 8 and rectangular protrusion 144 no longer remains positioned near to either notch 156. Although not shown in FIG. 12, but shown in FIG. 15, bottle cap assembly 102 has a stop 158 positioned within side channel 116 centrally between notches 156. Thus, when dispensing bottle cap assembly 102 is rotated relative to receptacle 8 so that rectangular protrusion 144 engages stop 158, bottle cap assembly 102 and receptacle 8 are in a fully locked position relative to one another.

Figure 13:
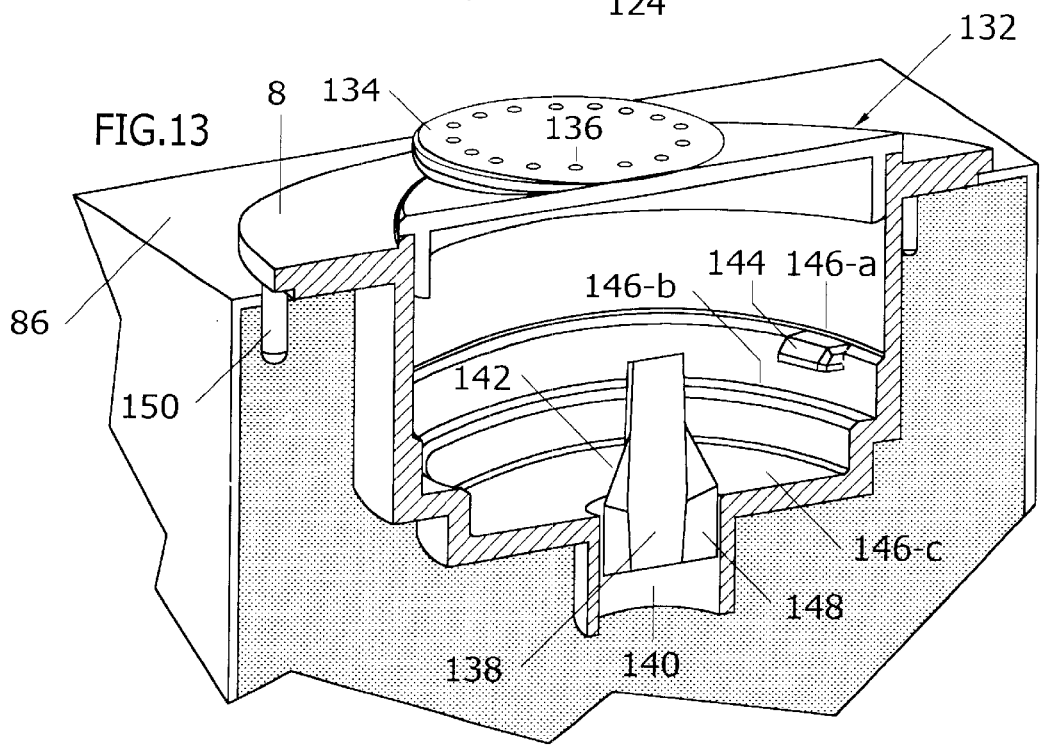
FIG. 13 is a sectional side view of the most preferred embodiment of the present invention receptacle having a substantially cylindrical housing with a radially extending flange depending from its upper opening, attachment pins downwardly depending from the flange, several stepped interior walls, a substantially rectangular-shaped protrusion attached to the inside wall surface of the housing, a bottom discharge opening, an upwardly tapering spring nut engagement member secured within the discharge opening that has an upper surface configured for partial insertion through the cutout pattern in the spring nut, and also having a dust cap sealing the upper opening in its housing.

FIG. 12 also shows a valve closure member 106 positioned against the upper surface of spring housing 108, and in close proximity to the outside side surfaces of spring housing 108. Thus, spring housing 108 performs the function of a valve seat for valve closure member 106. FIG. 12 further shows valve closure member 106 having an outwardly extending lower flange with a downwardly arcuate outer edge that engages the upper surface of one of the risers in the stepped interior wall of bottle cap member 114. In addition, FIG. 12 shows an activation pin 126 downwardly depending from the inside central surface of valve closure member 106 with its distal end being inserted through and connected to a disk-like spring nut 124. During its engagement with spring housing 108, activation pin 126 extends through the central opening 160 in the top surface of spring housing 108, central opening 160 being more clearly revealed in FIG. 14. FIG. 12 also shows activation pin 126 centered within a spring 122, with spring 122 extending between disk-like spring nut 124 and circular ridge 128. Spring 122 biases valve closure member 106 into its closed position against the top surface of spring housing 108, until bottle cap assembly 102 is moved longitudinally into contact with receptacle 8 whereby the tapering upper surfaces 142 of spring nut engagement member 138, as shown in FIG. 13, becomes partially inserted through the cutout pattern 168 in disk-like spring nut 124, shown in FIG. 17, and the top of spring nut engagement member 138 is permitted by disk-like spring nut 124 and spring 122 to push sufficiently against the tip of activation pin 126 to lift valve closure member 106 a fractional distance away from the top surface of spring housing 108. The compressed energy in spring 122 then causes valve closure member 106 to return to its closed position against spring housing 108, when dispensing bottle cap assembly 102 is removed from receptacle 8. The number of coils present in spring 122 is not critical, nor is the thickness dimension of disk-like spring nut 124 as long as each can effectively perform the function for which it was designed. Also, the diameter of the material used for spring 122 can vary in different applications. The diameter of spring housing 108 is also variable, but must allow ample clearance for movement of disk-like spring nut 124 and spring 122 within its hollow interior. The diameters of activation pin 126 and the central opening 160 in the upper surface of spring housing 108 can also vary in size, as long as the diameter of central opening 160 remains sufficiently large to allow easy movement of activation pin 126 therethrough without undue friction and wear. The number, size, and configuration of spiral threads 110 can also vary, as long as they provide complementary engagement with threads (not shown) on the outside neck surface of holding container 104. The thickness is valve closure member 106 is also not critical, as long as it has a minimum thickness dimension that allows it sufficient rigidity to permit material flow without the material of valve closure member 106 buckling or folding under the weight of the dry or liquid substance stored in holding container 104 as it begins to flow. Further, the pattern in the ribbed outer surface 8 of bottle cap member 114 is not critical, and need only to provide an easily-gripped surface for the hand of the person attempting to connect it to holding container 104. The thickness dimension of the material used for bottle cap member 114 should provide for a sturdy construction of bottle cap member 114. However, for cost-effective manufacturing the thickness of bottle cap member 114 should not be increased above or below the levels at which an appropriate benefit is no longer derived.

Although material used for manufacture can vary, it is contemplated for bottle cap member 114 in the most preferred embodiment of bottle cap assembly 102 to be made from plastic materials and have a unitary molded construction. Valve closure member 106 in the most preferred embodiment can be made from the same plastic material used for bottle cap member 114, or from a different material. For extended, trouble-free use, it is also contemplated for valve closure member 106 to have a unitary molded construction. It is further contemplated in the most preferred embodiment for coil spring 122 to be made from non-corroding, non-toxic materials, such as stainless steel, and for disk-like spring nut 124 to be made from either plastic or metal materials. Since it is intended for food or ingestible liquids to be transferred from holding container 104 to receptacle 8, all materials should be non-reactive and non-toxic. The size of holding container 104 relative to dispensing bottle cap assembly 102 is not critical, and does not have to be limited to that shown in FIG. 12. However, when hands-free transfer of material from holding container 104 to receptacle 8 is desired once dispensing bottle cap assembly 102 is locked in relation to receptacle 8, the shape of any holding container 104 connected to bottle cap member 114 must allow it to be inverted in a substantially symmetrical position over receptacle 8 for proper balance. Since it is contemplated for use with edible products, dispensing bottle cap assembly 102 should be made from materials that are easily cleaned and sanitized, with recyclable materials used when cost-effective.

FIG. 13 shows the preferred embodiment of the present invention targeted receptacle 8 for connection with dispensing bottle cap assembly 102, secured within the upper surface of chassis 866. The size of receptacle 8 relative to chassis 86 is not critical, and does not have to be limited to that shown in FIG. 13. In addition, connection of receptacle 8 should not be limited to the upper surface of chassis 8, and can be connected to a side surface of chassis 8, as long as discharge opening 140 is positioned in a superior position relative to field tube elbow 28 on freezing chamber 22 so that gravity-assisted flow can be used to introduce ingredients (not shown) into inner tube 24 prior to freezing. FIG. 13 shows receptacle 8 being substantially cylindrical, with an outwardly extending upper flange adjacent to its top open end and opposing attachment pins. 150 downwardly depending from the lower surface of the upper flange. The radially extending flange of receptacle 8 provides a connection means for attachment of receptacle 8 to chassis 8, as well as a connection means for hinged operation of a dust cap 132 over the top open end of receptacle 8 between periods of ingredient transfer. It is not critical for attachment pins 150 to be used for the connection of receptacle 8 to chassis 8, and any secure means can be used that allows receptacle 8 to remain stationary relative to chassis 8 when a bayonet turn is applied to dispensing bottle cap assembly 102 to lock it in place against the interior surface of receptacle 8. Also, when attachment pins 150 are used, they are not limited in size, configuration, or number to the two opposing attachment pins 150 shown in FIG. 13. In the most preferred embodiment of bottle cap assembly 102, it is contemplated for approximately six or seven attachment pins 150 to be used. FIG. 13 also shows receptacle 8 having a top open end and a hollow interior with several stepped interior surfaces 146*a*–*c* decreasing in diameter toward its bottom end, with a substantially rectangular-shaped protrusion 144 inwardly depending from the inside wall surface of the receptacle 8 between the uppermost stepped interior surface 146*a* and the middle stepped interior surface 146*b*. Although the most preferred embodiment of the present invention bottle cap assembly 102 would have a single protrusion 144 within receptacle 8 for more cost-effective manufacture, it is also considered to be within the scope of bottle cap assembly 102 to have more than one protrusion 144. FIG. 13 further shows receptacle 8 having a discharge opening 140 centrally within its bottom end and a spring nut engagement member 138 permanently mounted within discharge opening 140, with the middle and lower portions of spring nut engagement member 138 having several spaced-apart flukes 148 radially extending form its outside surface and each fluke 148 ending in an upwardly tapering surface 142. The configuration of upwardly tapering surface 142 limits the type of dispensing bottle cap assembly 102 that can be locked within receptacle 8 and initiate material transfer through discharge opening 140, to a dispensing bottle cap assembly 102 containing a spring nut 124 with a cutout pattern 168 that complements upwardly tapering surface 142. Should upwardly tapering surface 142 not be able to become partially inserted with cutout pattern 168 prior to a locking bayonet turn being applied to bottle cap assembly 102 to lock it within receptacle 8, as the bayonet turn is applied the spring nut engagement member 138 will not advance sufficiently forward within bottle cap member 114 to contact the tip of actuation pin 126 and cause valve closure member 106 to be lifted away from the upper surface of spring housing 108, and ingredient flow into inner tube 24 will not occur. Thus, used of bottle cap assembly 102, in addition to providing spill-free transfer, can also be used to limit the source of ingredients conveniently transferred into inner tube 24 for freezing. The number of flukes 148 on spring nut engagement member 138 is not critical, but should not be so numerous as to impede the flow of material through discharge opening 140. In the most preferred embodiment of bottle cap assembly 102 it is contemplated for four flukes 148 to be employed. In the most preferred embodiments of disk-like spring nut 124 and spring nut engagement member 138, spring nut engagement member 138 would have four flukes 148 with the upper tapering surface 142 of each fluke 148 being aligned to engage a different one of the arm members in the X-shaped opening 168. It is contemplated that spring nut engagement member 138 would be permanently secured within the discharge opening 140 in the bottom of receptacle 8, where flukes 148 would allow easy and unimpeded flow of ingredients through discharge opening 140. It is also contemplated that spring nut engagement member 138 would be manufactured from the same material used make receptacle 8, and in the most preferred embodiment spring nut engagement member 138 and receptacle 8 would be made as a single unit through molded construction.

Figure 19:
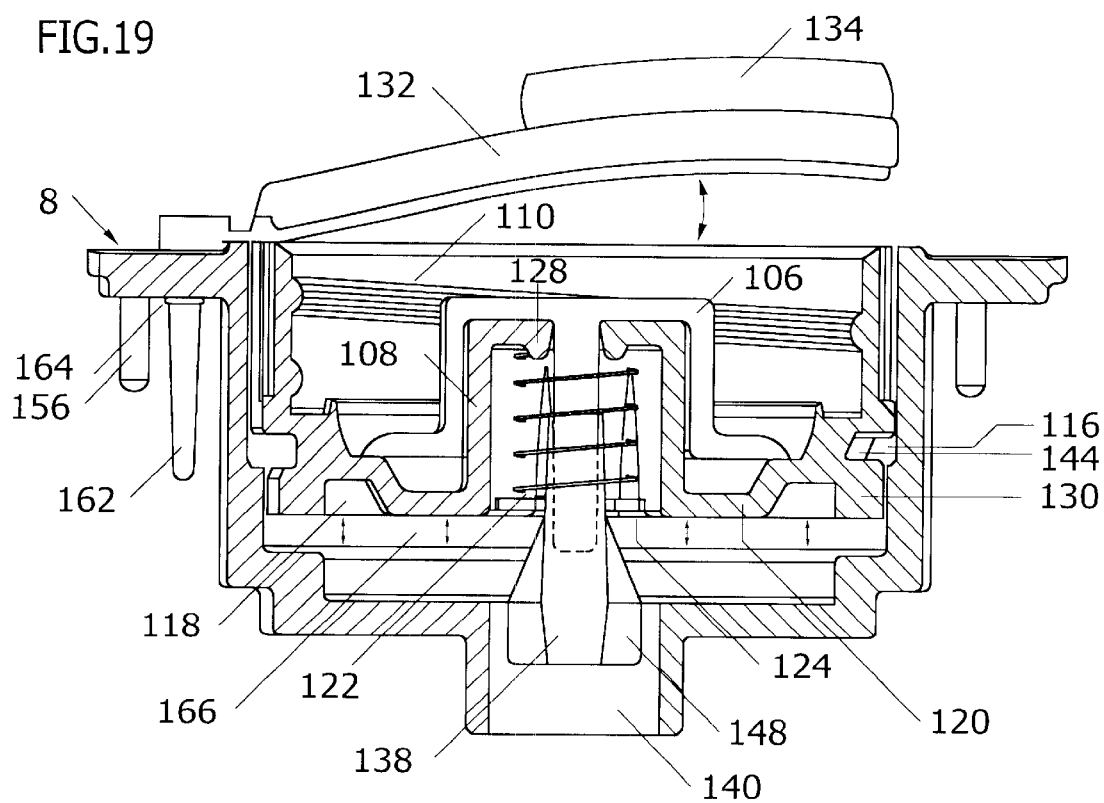
FIG. 19 is a sectional side view of the preferred embodiment of the present invention bottle cap system having a dispensing bottle cap assembly connected to its paired receptacle, with the bottle cap assembly having a bottle cap member, a spring housing attached to the sealed end of the bottle cap member, a spring-biased valve closure member seated upon the spring housing with an activation pin inserted through an upper opening in the spring housing and the valve closure member positioned so as to prevent material transfer, and the bottle cap assembly also having a disk-like spring nut attached to the lower end of the spring, with the targeted docking station receptacle having a housing with an upper flange, attachment pins downwardly depending from the flange, a bottom discharge opening, and an upwardly tapering spring nut engagement member within the discharge opening and having an upper surface configured for insertion through the cutout pattern in the spring nut, and the bottle cap system also having a dust cap employed for sealing the upper opening in the receptacle housing between material transfers with the dust cap being attached to the flange but in an unsealed position.

FIG. 13 further shows a dust cap 132 sealing the upper open end of receptacle 8 between ingredient transfer uses. The main body of dust cap 132 is in a position raised above the upper flange of receptacle 8, with its lower rim 174 extending downwardly a short distance within the top open end of receptacle 8. The hinged end of dust cap 132 that is shown in FIG. 19 is not visible in FIG. 13, and in the most preferred embodiment of present invention bottle cap assembly 102 the hinged end would comprise a single attachment post 162, a concave hinge member 176, and a retaining ring 164 on attachment post 162 near to hinge member 176. Attachment post 162 is used to securely connect the rearward end of dust cap 132 to the upper flange of receptacle 8. Attachment post 162 and concave hinge member 176 allow the main body of dust cap 132 to be rotated upwardly away from receptacle 8 prior to and during ingredient transfer, and lowered for renewed engagement with the top open end of receptacle 8 after ingredient transfer. A retaining ring 164 helps to prevent attachment post 162 from being inadvertently removed from the upper flange of receptacle 8 while the lower rim 174 of dust cap 132 is being inserted into and removed from the top open end of receptacle 8. Concave hinge member 176 allows the main body of dust cap 132, raised portion 134, and lower rim 176 as a unit to be rotated upwardly away from the top open end of receptacle 8, so that holding container 104 connected by threaded attachment to bottle cap assembly 102 can be placed into locking engagement with receptacle 8 for ingredient transfer. The attachment hole in the upper flange of receptacle 8, used for anchoring attachment post 162, remains hidden from view in FIG. 13. The diameter of such an attachment hole would correspond to the dimension required for insertion of attachment post 162 to the depth needed for proper seating of lower rim 174 within the top open end of receptacle 8. FIG. 13 shows the end of dust cap 132 remote from its hinged end having a front raised portion 134 that improves the grip of an operator's hand on dust cap 132 during removal of dust cap 132 from the upper opening in receptacle 8. The configuration of front raised portion 134 can be any shape that is aesthetically pleasing and easily manipulated by an operator's hand. FIG. 13 also shows a plurality of raised circular protrusions 136 on the top surface of front raised portion 134. Although raised circular protrusions 136 are mainly decorative, they can also be configured to assist in an improved operator grip for easy lifting of dust cap 132 away from receptacle 8 or replacing dust cap 132 within the upper opening on receptacle 8 between ingredient transfer use. In the most preferred embodiment of bottle cap assembly 102, it is not contemplated for raised portion 134 to be separable from the remainder of dust cap 132. Although not limited thereto, in the most preferred embodiments of the present invention the entire dust cap 132, or at least the main body of dust cap 132, raised portion 134, and lower rim 176 would be made from a flexible material such as plastic or rubber. Although FIG. 13 shows front raised portion 134 having a substantially circular configuration, it is considered to be within the scope of the present invention for any shape to be used that is aesthetically pleasing and easily manipulated by an operator's hand. FIG. 19 shows the top surface of front raised portion 134 having no surface decoration, in contrast to the raised circular protrusions 136 shown in FIG. 13. Surface decoration on raised portion 134 is considered to be merely a matter of design choice. Since chassis 8 has a balanced and stable configuration, hands-free ingredient transfer into freezing chamber 22 can occur after dispensing bottle cap assembly 102 is locked into receptacle 8 with a bayonet turn.

FIGS. 14 and 15 show the most preferred embodiment of the present invention bottle cap assembly 102 having a substantially cylindrical configuration, an arcuate open upper end, and a central spring housing 108 upwardly depending from its lower substantially sealed end. Bottle cap assembly 102 has ribbed outer surface 112 adjacent to its open upper end and an inner surface with spiral threads 110.

FIGS. 14 and 15 also show a side channel 116 adjacent to the lower end of bottle cap assembly 102, an outer bottom rim 130 adjacent to and below side channel 116, and a notch 156 through outer bottom rim 130. In addition, FIG. 14 shows spring housing 108 having a central opening 160 through its top surface, several spaced-apart and vertically-extending slots 154 through in its outside surface, and each slot 154 communicating at its lower end with a small hole 152 at the base of spring housing 108. The configuration of ribbed outer surface 112 is not critical, and not limited to that shown in FIGS. 14 and 15. However, the configuration of ribbed outer surface 112 must be one that is easily gripped by an adult human hand for prompt attachment or removal of bottle cap member 114 from holding container 104. Also, spiral threads 110 can have any configuration that securely connects bottle cap member 114 to the neck of a targeted holding container 104 and provides a leak-proof connection therebetween. The notches 156 through outer bottom rim 130 must be dimensioned and configured for insertion of substantially rectangular protrusion 144 on the inside surface of receptacle 8, so that as bottle cap assembly 102 is longitudinally moved into contact with receptacle 8, and a bayonet turn is applied, side channel 116 can be made to move around rectangular protrusion 144 until rectangular protrusion 144 makes contact with the stop 158 within side channel 116, that is shown in FIG. 15 centrally positioned between opposing notches 156. Although the most preferred embodiment of the present invention bottle cap assembly 102 would have a single stop 158 within side channel 16 of bottle cap member 114 for more cost-effective manufacture, it is also considered to be within the scope of bottle cap assembly 102 to have more that one stop 158, two notches 156, or protrusion 144. The size of central opening 160 should be sufficient to allow easy movement therethrough of activation pin 126 and prompt lifting of valve closure member 106 away from the outside surface spring housing 108 once bottle cap assembly 102 is brought longitudinally into contact with receptacle 8. Further, the number and dimension of vertically-extending slots 154 and small holes 152 through spring housing 108 are not critical, although for most applications it would be preferred to have approximately 4–6 vertically-extending slots 154 and small holes 152 to allow prompt smooth ingredient flow from holding container 104 through receptacle 8 and into the inner tube 24 of freezing chamber 22. FIG. 15 also shows bottle cap assembly 102 having a circular bottom channel 118, a central bottom surface 120 below spring housing 108, with the small holes 152 at the base of spring housing 108 extending through central bottom surface 120. In addition, FIG. 15 shows the tip of the activation pin 126 that is attached to spring-biased valve closure member 106 centrally visible through central bottom surface 120, the disk-like spring nut 124 visible around the tip, and small holes 152 visible around disk-like spring nut 124. When valve closure member 106 is lifted from the top surface of spring housing 108, dry or liquid material (not shown) from holding container 104 is allowed to flow through small holes 152, beyond disk-like spring nut 124, and into receptacle 8. Although not limited thereto, in the most preferred embodiment it is contemplated for bottle cap assembly to be formed as a single rigid unit from molded construction, and made from plastic materials.

FIG. 16 shows the most preferred embodiment of the present invention spring-biased valve closure member 106 having a substantially cylindrical main body and a hollow interior, with an upper closed end and a bottom open end. FIG. 16 also shows the outwardly extending lower flange around the open end of its main body having a downwardly arcuate outer edge. In addition, FIG. 16 shows central activation pin 126 downwardly depending from the interior surface of the upper closed end of the main body of valve closure member 106, in a position extending below the plane of its outer edge. Thus, when valve closure member 106 is seated upon spring housing 108 with its activation pin 126 inserted through the central opening 160 in the upper end of spring housing 108, and a spring 122 is connected between the upper interior surface of spring housing 108 and a disk-like spring nut 124 having a particular cutout pattern 168 with spring nut 124 positioned adjacent to the lower open end of spring housing 108, only a receptacle 8 having a spring nut engagement member 138 with tapering upper surfaces 142 allowing for partial insertion through cutout pattern 168 will be able to reach the tip of activation pin 126 and lift valve closure member 106 from its spring housing 108 valve seat to initiate transfer of ingredients (not shown) into receptacle 8 secured within chassis 8. In the most preferred embodiment of bottle cap assembly 102, valve closure member 106 would be formed as a single rigid unit from molded construction, and made from plastic materials. While it is contemplated that the same plastic material used for bottle cap member 114 could be used in valve closure member 106, the thickness dimension of valve closure member 106 would typically be less than that the thickness dimension of most surfaces of bottle cap member 114. However, the thickness dimension of valve closure member 106 should be sufficient so that the flow of ingredients from holding container 104 across downwardly arcuate outer edge of its flange does not cause the outer edge to buckle, fold, or otherwise be subject to a change in configuration that would obstruct proper reseating of valve closure member 106 against spring housing 108 after ingredient transfer.

FIG. 17 shows the most preferred embodiment of the present invention spring nut 124 having a disk-like configuration and a central cutout pattern 168 comprising a round hole portion intersecting with an X-shaped opening wherein the length of each arm member of the X-shaped opening is approximately twice that of the diameter dimension of the round hole portion. The configuration of cutout pattern 168 is not critical and other patterns are considered to also be within the scope of the present invention. However, cutout pattern 168 must complement the configuration of the upwardly tapering surfaces 142 of spring nut engagement member 138 so that as bottle cap assembly 102 is moved longitudinally toward receptacle 8 and comes very near to receptacle 8, upwardly tapering surfaces 142 become partially inserted within cutout pattern 168, and so that when bottle cap assembly 102 is finally placed in full contact with receptacle 8, the top of spring nut engagement member 138 will have made sufficient contact with the tip of activation pin 126 to fractionally raise it and thereby lift valve closure member 106 a short distance away from the top outside surface of spring housing 108 to initiate material flow downwardly past the outer edge of valve closure member 106. Broken lines in FIG. 20 show the direction of material flow anticipated around the downwardly arcuate outer edge of valve closure member 106 in the most preferred embodiment of bottle cap assembly 102.

FIG. 18 shows the most preferred embodiment of the coil spring 122 used in the present invention bottle cap assembly 102, with spring 122 having a substantially uniform diameter dimension and uniformly spaced apart coils. During use of spring 122 within dispensing bottle cap assembly 102, activation pin 126 centered within spring 122, with spring 122 extending between disk-like spring nut 124 and the circular ridge 128 on the top inside surface of spring housing 108. The number of coils present in spring 122, and the material from which spring 122 is made, are not critical as long as spring 122 can properly bias valve closure member 106 into its fully closed position against the top surface of spring housing 108. Although the diameter of spring housing 108 can vary, it must allow ample clearance for unrestricted movement of the spring 122 chosen for use within its hollow interior. Further, the diameter of spring 122 can vary in different applications, as long as disk-like spring nut 124 is also correspondingly sized to engage it, maintain spring 122 within spring housing 108, and move spring 122 the correct longitudinal distance within spring housing 108 after bottle cap member 114 is finally in full contact with receptacle 8 so that the top of spring nut engagement member 138 comes in contact with the tip of activation pin 126 with sufficient force to compress spring 122 and lift valve closure member 106 the necessary distance above spring housing 108 to initiate ingredient flow into receptacle 8. After the needed amount of ingredient transfer is complete, bottle cap assembly 102 is separated from receptacle 8, and the upper surfaces 142 of spring nut engagement member 138 are no longer in contact with the tip of activation pin 126, the stored compression energy in spring 122 causes valve closure member 106 to again be biased in a closed position against the outside surface of spring housing 108. In the most preferred embodiment of bottle cap assembly 102, it is not contemplated for more than a fractional movement of valve closure member 106 to take place, for example but not limited to a distance of one-sixteenths of an inch, before it is sufficiently unseated from spring housing 108 to initiate material flow around outer edge 34.

Figure 20:
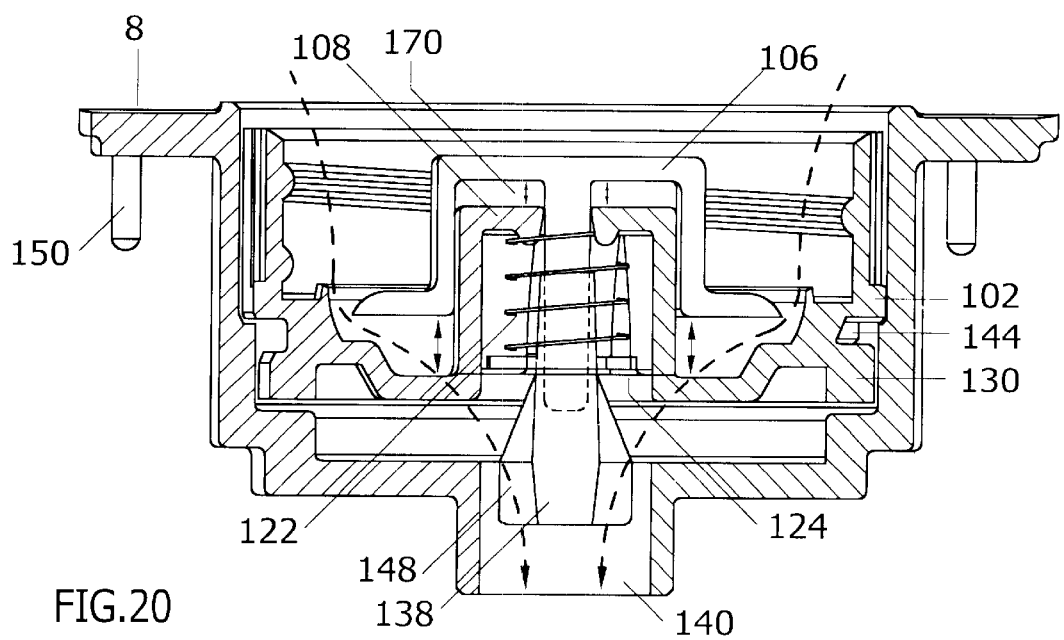
FIG. 20 is a sectional side view of the preferred embodiment of the present invention bottle cap system with the spring-biased valve closure member raised-into an open position allowing material transfer, with the broken lines showing the anticipated direction of material flow.

FIGS. 19 and 20 respectively show dispensing bottle cap assembly 102 in partially assembled and fully assembled condition. FIG. 19 shows dispensing bottle cap assembly 102 partially inserted within receptacle 8 prior to full contact with the bottom inside surface of receptacle 8, illustrated by the gap 166 and small arrows between the central bottom surface 120 of bottle cap member 114 and the bottom inside surface of receptacle 8. As also shown in FIG. 19, valve closure member 106 remains in a closed position against the top surface of spring housing 108 so as to prevent ingredient flow into receptacle 8. In contrast, FIG. 20 shows dispensing bottle cap assembly 102 fully inserted within receptacle 8, after the bayonet turn has been made that locks protrusion 144 within channel 116 to secure dispensing bottle cap assembly 102 to receptacle 8, with the central bottom surface 120 of bottle cap assembly 102 is being in full contact with the bottom inside surface of receptacle 8, as illustrated by the gaps 170 and small arrows between valve closure member 106 and the top surface of spring housing 108, as well as between the inside bottom surface of bottle cap assembly 102 and the downwardly curving outer edge of the flange that is radially depending around the lower open end of valve closure member 106. In such a position, FIG. 20 shows valve closure member 106 in an open configuration that would allow ingredients (not shown) to flow from an inverted holding container 104 attached to dispensing bottle cap assembly 102, all the way through receptacle 8 and into the inner tube 24 of freezing chamber 22. The amount of separation in FIG. 20 between outer edge 34 and the inside bottom surface of bottle cap assembly 102 is enlarged for illustrative purposes. FIG. 19 further shows dust cap 132 in a partially opened position above the upper opening in receptacle 8, with double-headed arrows showing that dust cap 132 can be moved in both upward and downward directions relative to receptacle 8 when required.

Dust cap 132 is employed for sealing the upper opening in receptacle 8 between uses of receptacle 8 for ingredient transfer, with dust cap 132 being attached to the upper flange of receptacle 8 through use of an attachment post 162. A ring 164 would keep attachment post 162 from being inadvertently removed from the upper flange in receptacle 8 while in use. A concave hinge member 176 allows the main body of dust cap 132, raised portion 134, and lower rim 174 to be rotated upwardly as a unit away from the top end opening in receptacle 8, so as not to adversely interfere with holding container 104 while it is connected by threaded attachment to a bottle cap member 114 in locked engagement with receptacle 8. Manufacture of bottle cap member 114, valve closure member 106, disk-like spring nut 124, and receptacle 8, could each be accomplished through unitary construction from molded plastic. Spring 122 is not limited to any one type of material, however, it should have sturdy and durable construction for trouble-free repeat use over an extended period of time. In the most preferred embodiment of the present invention, the spring nut engagement member 138 would be molded in a fixed position within discharge opening 140 as part of receptacle 8. Dispensing bottle cap assembly 102 would be placed into its usable form by inserting valve closure member 106 within bottle cap member 114 so that activation pin 126 extends through central aperture 74 in spring housing 108. A coil spring 122 would be placed within the hollow interior of spring housing 108 either before or after activation pin 126 is inserted therethrough, and then prevented from being withdrawn from the open end of spring housing 108 by disk-like spring nut 124. When valve closure member 106 is in its fully closed position against the top surface of spring housing 108, and preventing communication between the upper portion of bottle cap member and small holes 74 around the base of spring housing 108, activation pin 126 would extend a small distance below the central bottom surface 120 of bottle cap member 114. No further assembly would be required to place receptacle 8 into its usable condition, except that a dust cap 132 made from a unitary molded construction and flexible material can be placed within the upper opening of receptacle to keep unwanted objects from becoming deposited on the interior walls of receptacle 8 so that it does not require cleaning between uses.

Although not limited there to, most of the objects mounted with chassis 86 are done so with various types of screws (not shown), or bolts, nuts, and washers. Further, although not critical in the preferred embodiment it is contemplated for tubing 100 in the most preferred embodiment of the present invention, connected between receptacle 8 and freezing chamber 22, to be flexible tygon tubing. For most efficient mixing of food product ingredients (not shown) within inner tube 24, it preferred that the inside surface of inner tube 24 be substantially smooth. One suggested material for inner tube 24 is stainless steel. Outer tube 26 can be made from non-thermally conductive materials, or comprise one or more layers of thermally insulating materials. It is also preferred that the surfaces of auger blade 42 be smooth. Cleaning solution (not shown) is also introduced into inner tube 24 via receptacle 8 for the automatic cleaning cycle using control panel 18. However, manual cleaning of auger assembly 40 can also be an alternative, by removal of cover 6, dispensing head assembly 10, and the end cap 74 from freezing chamber 22. Also, it is contemplated for auger assembly 40 to be made from components that are dishwasher safe. Further, when any automated cycle is complete, although not shown, the present invention can comprise any known means of audible or visual signaling, such as an LED light, to let a user know that the soft frozen product is ready for consumption. Although not limited thereto, a unit with a housing 4 having a width dimension of approximately eight inches, a height dimension of approximately 16 inches, and a depth dimension of less than eighteen inches and weighing less than fifty pounds, would be able to produce approximately thirty ounces of frozen product with each cycle. The type of consumable product created with the present invention is only limited by one's imagination and can include frozen coffee, teas, adult drinks, slush beverages, milk shakes, frozen yoghurt and yoghurt based beverages, as well as soft serve ice cream and other soft frozen dessert concoctions. The present invention is low cost, takes up little space, and has easy maintenance. In addition to domestic use, it can also be used in convenience stores, gas stations, cafeterias, hospitals, offices, bars, and restaurants.

I claim:

1. A fully integrated, automated and programmable, portable domestic frozen food and beverage system that is self-cleaning and capable of rapidly and automatically preparing and dispensing soft ice cream products, slush drinks, and other frozen beverages in an efficient and spill-free manner, said system comprising:

a housing having a hollow interior and heat exhaust means within said hollow interior configured for dissipating heat generated therein;

a freezing chamber having a thermally conductive inner tube and a non-conductive outer tube, with a sealed area between said inner tube and said outer tube, and at least one inlet port configured to introduce coolant into said sealed area, in addition to one return port configured to transport coolant from said sealed area, said freezing chamber being secured within said housing;

an auger assembly supported within said inner tube and being configured for thoroughly mixing ingredients introduced into said inner tube for producing soft frozen foods and beverages, said auger member having a front wiper and a rear wiper, as well as a drive shaft;

a receptacle positioned through said housing in a location more elevated than said freezing chamber for gravity flow of non-frozen consumable ingredients from said receptacle into said freezing chamber, said receptacle being in fluid communication with said inner tube;

a bottle cap assembly configured for locking connection with said receptacle and having internally spiraling threads for connection to a bottle having an externally threaded neck and further configured so that when a bottle containing transferable ingredients is secured to said bottle cap assembly using said internally spiraling threads and said bottle cap assembly and the bottle are inverted, ingredient transfer is blocked until said bottle cap assembly is firmly seated within said receptacle;

an auger motor connected to said drive shaft of said auger assembly;

a dispensing head assembly configured for connection to said freezing chamber and dispensing of soft frozen food and beverage products;

coolant introduction means connected to said freezing chamber and adapted for rapidly and evenly cooling said thermally conductive inner tube;

a solenoid;

system activation means adapted for initiating automatic production of soft frozen food and beverage products;

power source connection means;

a solenoid control electrically connected between said solenoid and said system activation means; and microprocessor means whereby when a user introduces ingredients through said receptacle using said bottle cap assembly and thereafter makes a selection using the portion of said system activation means corresponding to the type of consumable product desired, said microprocessor means automatically engages said solenoid, said compressor, said condenser, and said auger motor to introduce coolant between said inner tube and said outer tube in said freezing chamber and evenly cool said thermally conductive inner tube for rapid cooling of the ingredients while they are being mixed by said auger assembly, and when the resistance encountered by said auger reaches a predetermined level of torque, said microprocessor means will automatically cause cessation of cooling and mixing, with dispensing of the prepared soft frozen consumable product and cleaning of said inner tube after food and beverage dispensing being also initiated by selection of different options available through said system activation means.

2. The system of claim 1 further comprising a transformer.

3. The system of claim 1 further comprising audible signaling means.

4. The system of claim 1 further comprising visual signaling means.

5. The system of claim 1 wherein said heat exhaust means comprises a fan and a plurality of vent openings within said housing.

6. The system of claim 1 wherein said system activation means comprises a plurality of touch keys connected through said housing.

7. The system of claim 1 wherein said coolant introduction means comprises a compressor connected to said freezing chamber and a condenser connected to said compressor.

* * * * *